United States Patent
Kobayashi

(10) Patent No.: US 8,948,811 B2
(45) Date of Patent: Feb. 3, 2015

(54) COMMUNICATION TERMINAL DEVICE

(75) Inventor: Hiroki Kobayashi, Daito (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 13/061,322

(22) PCT Filed: Aug. 21, 2009

(86) PCT No.: PCT/JP2009/064606
§ 371 (c)(1),
(2), (4) Date: Feb. 28, 2011

(87) PCT Pub. No.: WO2010/024183
PCT Pub. Date: Mar. 4, 2010

(65) Prior Publication Data
US 2011/0159922 A1 Jun. 30, 2011

(30) Foreign Application Priority Data
Aug. 28, 2008 (JP) .................................. 2008-219597

(51) Int. Cl.
H04M 1/00 (2006.01)
H04M 1/2745 (2006.01)

(52) U.S. Cl.
CPC .... *H04M 1/27455* (2013.01); *H04M 1/274508* (2013.01); *H04M 2250/52* (2013.01)
USPC .......................... 455/556.1; 455/415; 455/418

(58) Field of Classification Search
CPC .................. H04M 2250/52; H04M 1/274508; H04M 1/27455; H04M 1/72522
USPC ........................ 455/556.1, 415, 418
See application file for complete search history.

(56) References Cited

U.S. PATENT DOCUMENTS 7,162,497 B2 * 1/2007 Wu ........................................ 1/1
7,515,941 B2 * 4/2009 Kwon et al. ................... 455/564
(Continued)

FOREIGN PATENT DOCUMENTS

JP 02-219344 A 8/1990
JP 07-162497 A 6/1995
(Continued)

OTHER PUBLICATIONS

International Search Report and Written Opinion dated Dec. 1, 2009 issued by the Japanese Patent Office for International Application No. PCT/JP2009/064606.
(Continued)

*Primary Examiner* — Marcos Torres
(74) *Attorney, Agent, or Firm* — Procopio, Cory, Hargreaves & Savitch LLP

(57) ABSTRACT

[Object]
To provide a communication terminal device capable of performing an image registration correlating with address book information with an easy operation.
[Constitution]
A mobile phone includes: a camera module 24 for shooting a subject; a memory 105 for storing address book information including telephone numbers; a numeric key portion 11 for an input; and a CPU 100 for extracting the address book information relating to information input by the numeric key portion 11 from the memory 105 and for storing an image shot by the camera module 24 by correlating the image with the address book information in the memory 105 at the same time. When the subject is shot by the camera module 24 after the information is input by the numeric key portion 11, the CPU 100 correlates the image with the extracted address book information and stores them in the memory 105.

3 Claims, 23 Drawing Sheets

(56) References Cited

U.S. PATENT DOCUMENTS

2004/0207722 A1* 10/2004 Koyama et al. ............ 348/14.02
2008/0075244 A1* 3/2008 Hale et al. .................. 379/88.13

FOREIGN PATENT DOCUMENTS

| JP | 2000-188634 A | 7/2000 |
|----|---------------|--------|
| JP | 2003-087617 A | 3/2003 |
| JP | 2004-336711 A | 11/2004 |
| JP | 2007-258893 A | 4/2007 |
| KR | 10-2005-0101162 A | 10/2005 |

OTHER PUBLICATIONS

Decision of Rejection dated Oct. 23, 2012, issued in counterpart Korean Application No. 10-2011-7007026.
Notification of Reasons for Refusal dated Mar. 12, 2013, issued in counterpart Japanese Application No. 2008-219597.
Decision of Rejection dated Dec. 7, 2012, issued in counterpart Korean Application No. 10-2011-7007026.
Notice of Grounds for Rejection dated Mar. 26, 2012, issued in counterpart Korean Application No. 10-2011-7007026.
Notification of Reasons for Refusal dated Jul. 24, 2012, issued in counterpart Japanese Application No. 2008-219597.
Notification of Reasons for Refusal dated Aug. 19, 2014 issued in corresponding Japanese application No. 2013-264907.
"Instruction Manual of Mova N506i, NTT DoCoMo" NTT DoCoMo, May 2004, pp. 85-104.
"Instruction Manual of A5302CA, au," au (KDDI) Okinawa cellular phone, Dec. 2002, pp. 109-133.
Non-Patent Literature cited in the Notification of Reasons for Refusal dated Aug. 19, 2014 issued in corresponding Japanese application No. 2013-264907: "Instruction Manual of Mova N506i, NTT DoCoMo," pp. 92-93.

* cited by examiner (a)

ADDRESS BOOK TABLE

| REGISTRATION NUMBER | TELEPHONE NUMBER | E-MAIL ADDRESS | NAME | ID NUMBER |
|---|---|---|---|---|
| 001 | xxxxxxxxxx | xxxxxxxxxxxxxxx | xxxxxxxxxxxxxx | xxx |
| 002 | xxxxxxxxxx | xxxxxxxxxxxxxxx | xxxxxxxxxxxxxx | |
| .... | .... | .... | .... | .... |
| 999 | xxxxxxxxxx | xxxxxxxxxxxxxxx | xxxxxxxxxxxxxx | xxx |

(b)

SPEED DIAL TABLE

| ABBREVIATED NUMBER | TELEPHONE NUMBER | NAME |
|---|---|---|
| 01 | xxxxxxxxxx | xxxxxxxxxx |
| 02 | xxxxxxxxxx | xxxxxxxxxx |
| .... | .... | .... |
| 99 | xxxxxxxxxx | xxxxxxxxxx |

FIG. 3

FIG. 11

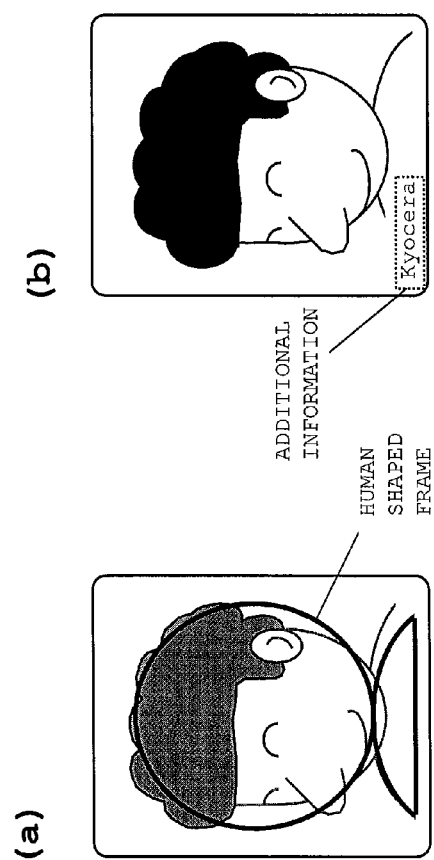

COMMUNICATION TERMINAL DEVICE

TECHNICAL FIELD

The present invention relates to communication terminal devices such as mobile phones and personal digital assistants (PDAs).

BACKGROUND ART

Conventionally, mobile phones are provided with an address book function. Such address book function displays address book information on a display screen based on an operation done by a user. The address book information comprises phone numbers, E-mail addresses, names, addresses, etc. This information is corresponded to registration numbers (ID number) and registered in a memory.

Also, the mobile phones usually comprise a camera. Among these mobile phones, some of them store images shot by the cameras (for example, a photograph of a person's face) by corresponding them with the address book information (register in the address book), and display the images together with the address book information on the display screen (for example, patent documents 1 and 2).

Patent document 1: JP2003-87617A
Patent document 2: JP2004-336711A

DISCLOSURE OF THE INVENTION

Problem to be Solved by the Invention

However, the above mobile phones might require a complicated operation to register a shot image in the address book.

When registering an image by using a camera mode, the following operations are required: first, the camera is activated and an image is shot; then the address book function is activated and the address book information subject to registration is selected from the address book; and after that the image shot is registered. Also, when an image is registered from the address book function, the following operations are required: first, the address book function is activated and the address book information subject to registration is selected; after that the camera is activated and the image is shot; then this image is registered.

In any event, operations of running two functions of a camera and address book are necessary, so the number of operating steps increases at any rate.

The present application is to solve such a problem, and its objection is to provide a communication terminal device capable of registering an image corresponding to address book information with a simple method.

Means to Solve the Problem

The communication terminal device of the present invention comprises: a camera portion for shooting a subject; a memory portion for storing address information including a telephone number; an input portion for performing an input; an extraction portion for extracting the address book information relating to information input by the input portion from the memory portion; and a control portion for storing an image shot by the camera portion by correlating the image with the address book information in the memory portion, wherein the control portion stores the image in the memory portion by correlating the image with the address book information extracted by the extraction portion when the subject is shot by the camera portion after the information is input by the input portion.

BRIEF DESCRIPTION OF THE DRAWINGS

FIG. 3 is a diagram showing an address book table and speed dial table in the embodiment;

FIG. 11 is a diagram showing screen display examples showing the extracted address book information in the modification example 2.

FIG. 23 is a diagram showing a configuration of a modification example of others.

Figure 1:
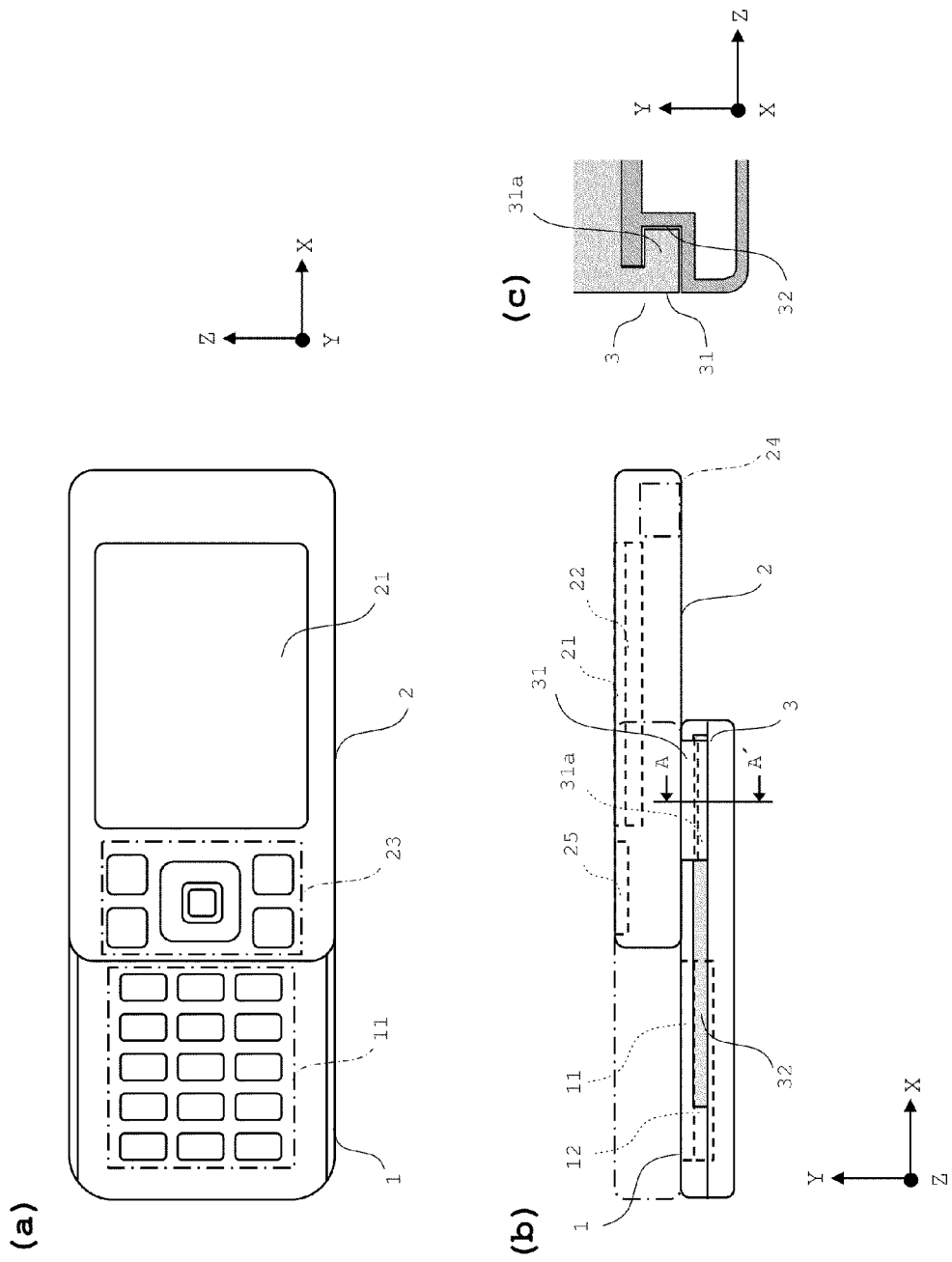
FIG. 1 is a diagram showing an external configuration of a mobile phone in an embodiment of the present invention.

However, the drawings are only for the purpose of description, and do not limit the scope of the present invention.

BEST MODE FOR CARRYING OUT THE INVENTION

An embodiment of the present invention will be described below with reference to the drawings. In a mobile phone related to the embodiment and the mobile phone related to modification examples from 1 to 4 described below, a numeric key portion 11 and main key portion 23 correspond to an "input portion" recited in a scope of claims. Also, a camera module 24 corresponds to a "camera portion" recited in the scope of the claims. Further, a memory 105 corresponds to a "memory portion" recited in the scope of the claims. Furthermore, an "extraction portion," "control portion" and "selection portion" in the scope of the claims are realized as a function given to a CPU 100 by a control program stored in the memory 105.

In a PDA related to a modification example 5 of an embodiment described below, a keyboard 51 corresponds to the "input portion" recited in the scope of the claims. Also, a camera module 67 corresponds to the "camera portion" recited in the scope of the claims. Further, a memory 204 corresponds to the "memory portion" recited in the scope of the claims. Furthermore, the "extraction portion," "control portion" and "selection portion" recited in the scope of the claims are realized as functions given to a CPU 200 by a control program stored in the memory 204.

It is noted that the scope of the claims of the present invention should not be interpreted as limited within the embodiment and modification examples by the description above which matches the scope of the claims and embodiments.

FIG. 1 is a diagram showing an external configuration of a mobile phone: FIG. 1(a) is a front view of the mobile phone with a second cabinet opened; FIG. 1(b) is a side view of the mobile phone in the same state; and FIG. 1(c) is a cross-section view of FIG. 1(b) taken along A-A'.

The mobile phone includes the first cabinet 1 and the second cabinet 2. The first cabinet 1 has a numeric key portion 11. The numeric key portion 11 includes a plurality of number/character input keys, call starting key and call ending key, etc. On the back of the numeric key portion 11, a back light device 12 (hereinafter, referred to as "key backlight") is disposed. The key backlight 12 comprises an LED to be alight source, and provides light to the numeric key portion 11. Thus, the user can see the display on each key even when the surroundings are dark.

A liquid crystal panel 21 with a vertically long rectangular shape is disposed on the front side of the second cabinet 2, and its display surface is facing the front. A backlight device 22 (hereinafter, referred to as a "panel backlight") is disposed behind the liquid crystal panel 21. The panel backlight 22 comprises an LED to be a light source, and provides light to the liquid crystal panel 21.

A main key portion 23 is further disposed on the front side of the second cabinet 2. The main key portion 23 comprises: a mode key for activating each kind of function modes (a camera mode, e-mail mode, internet mode and address book mode); a move key for scrolling a screen and moving the highlight focus; and an OK key for performing each kind of decision operation.

A camera module 24 is disposed inside the second cabinet 2. A lens window (not shown) of the camera module 24 is exposed from a back surface of the second cabinet 2, and an image of a subject is taken into the camera module 24 from this lens window.

The second cabinet 2 is connected to the first cabinet 1 by a slide mechanism section 3 in such a manner as to be slidable in a direction of an X axis shown in FIG. 1. As shown in FIG. 1(c), the slide mechanism section 3 is constituted by guide plates 31 and guide grooves 32. The guide plates 31 are arranged on a back surface of the second cabinet 2 at right and left ends, and have projecting streaks 31a at lower ends thereof. The guide grooves 32 are formed on side surfaces of the first cabinet 1 along a direction of sliding (X-axis direction of FIG. 1). The projecting streaks 31a of the guide plates 31 engage with the guide grooves 32.

When the mobile phone is closed, the second cabinet 2 lies almost completely over the first cabinet 1, as shown by a dashed line in FIG. 1(b). In this state (closed state), all the keys on the numeric key portion 11 are hidden behind the second cabinet 2. The second cabinet 2 can slide (open) until the guide plates 31 reaches ends of the guide grooves 32. When the second cabinet 2 is fully opened, all the keys of the numeric key portion 11 are externally exposed as shown in FIG. 1(a).

Figure 2:
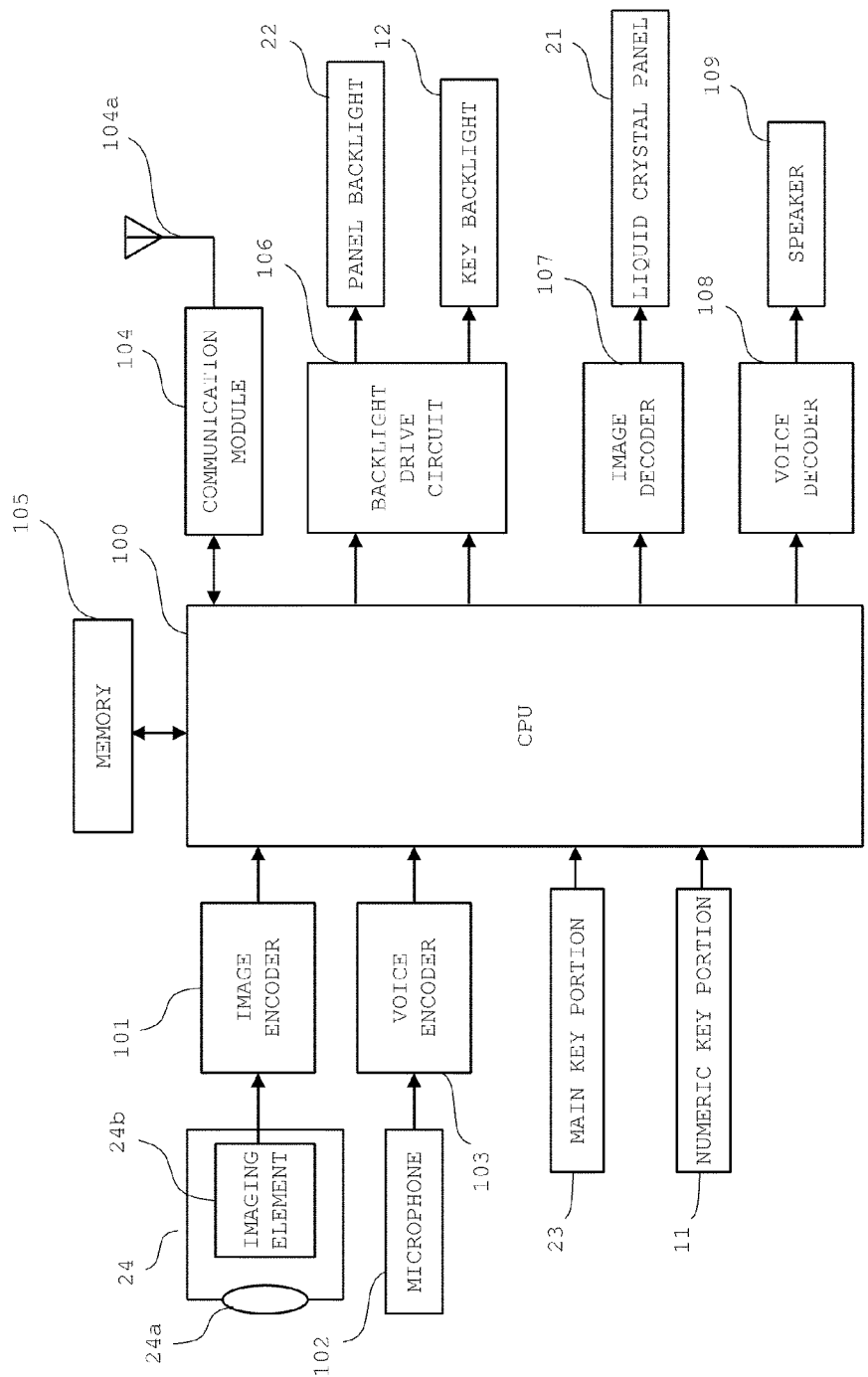
FIG. 2 is a block diagram showing an entire configuration of the mobile phone in the embodiment.

FIG. 2 is a block diagram showing an entire configuration of a mobile phone. Besides the constitutional elements described above, the mobile phone of this embodiment includes a CPU 100, an image encoder 101, a microphone 102, a voice encoder 103, a communication module 104, a memory 105, a backlight drive circuit 106, an image decoder 107, a voice decoder 108, and a speaker 109.

The camera module 24 is constituted by an imaging lens 24a, imaging element 24b, and so forth. The imaging lens 24a provides a subject image on the imaging element 24b. The imaging element 24b is made of, for example, a CCD, generates image signals in accordance with a captured image and output the same to the image encoder 101. The image encoder 101 converts the image signal from the imaging element 24b into a digital image signal capable of being processed by the CPU 100, and outputs the same to the CPU 100.

The microphone 102 converts an audio signal into an electric signal, and outputs the same to the voice encoder 103. The voice encoder 103 converts the audio signal from the microphone 102 into a digital audio signal capable of being processed by the CPU 100, and outputs the same to the CPU 100.

The communication module 104 converts audio signals, image signals, text signals, and the like from the CPU 100 into radio signals, and transmits the same to a base station via an antenna 104a. In addition, the communication module 104 converts radio signals received via the antenna 104a into audio signals, image signals, text signals, and the like, and outputs the same to the CPU 100.

The memory 105 includes a ROM and a RAM. The memory 105 stores control programs for imparting control functions to the CPU 100. In addition, the memory 105 stores data of images shot by the camera module 24, and image data, text data (mail data), and the like captured externally via the communication module 104, in predetermined file formats.

Further, the memory 105 includes an address book table shown in FIG. 3(a) and a speed dial table (hereinafter, referred to as "SD table") shown in FIG. 3(b).

With reference to FIG. 3(a), in the address book table, address book information, such as telephone numbers, e-mail addresses, names, etc., is registered and correlated with three digit registration numbers. In addition, ID numbers (management numbers) of the image data (for example, photographs of the faces of the telephone number holders) stored in the memory 105 is correlated with the address book information and registered. The ID number is not registered in a space of the address book information to which the image data is not correlated with the address book information.

In reference to FIG. 3(b), in the SD table, address book information, such as telephone numbers, names, etc. is registered and correlated with two digit abbreviated numbers. By assigning an abbreviated number to a telephone number, the telephone number is registered in the SD table.

Returning to FIG. 2, the backlight drive circuit 106 supplies a voltage signal to the backlight 22 and Key back light 12 in accordance with a control signal from CPU 100.

An image decoder 107 converts image signals from the CPU 100 into analog image signals which can be shown on the liquid crystal panel 21, and outputs the signals to the liquid crystal panel 21.

A voice decoder 108 converts voice signals from the CPU 100 into analog voice signals which can be output from the speaker 109, and outputs the signals to the speaker 109. The speaker 109 reproduces the voice signals from the voice decoder 108 as a voice.

The CPU 100 performs a process of various sorts of function modes by outputting control signals to each portion such as the communication module 104, the image decoder 107, the voice decoder 108, etc. based on the input signals from each portion such as the camera module 24, the microphone 102, the main key portion 23, the numeric key portion 11, etc.

For example, the CPU 100 activates the address book mode when the mode key of the address book mode is pressed. Then, in this function mode, when the user performs a predetermined selection operation, selected address book information is displayed on the liquid crystal panel 21. At this point, when there is an image correlated and registered with this address book information, the image is displayed together with the address book information on the liquid crystal panel 21.

Also, when an abbreviated number is input, and a call starting key is pushed, the CPU 100 calls up the telephone number corresponding to the abbreviated number from the SD table and performs a calling process with the telephone number.

The mobile phone of the present embodiment can store the images shot by the camera module 24 in the memory 105 (registered in the address book) by correlating the image and the address book information. Then, as above, in the address book mode, the registered image can be displayed together with the address book information on the liquid crystal panel 21. The image registration process on the address book will be described below.

Figure 4:
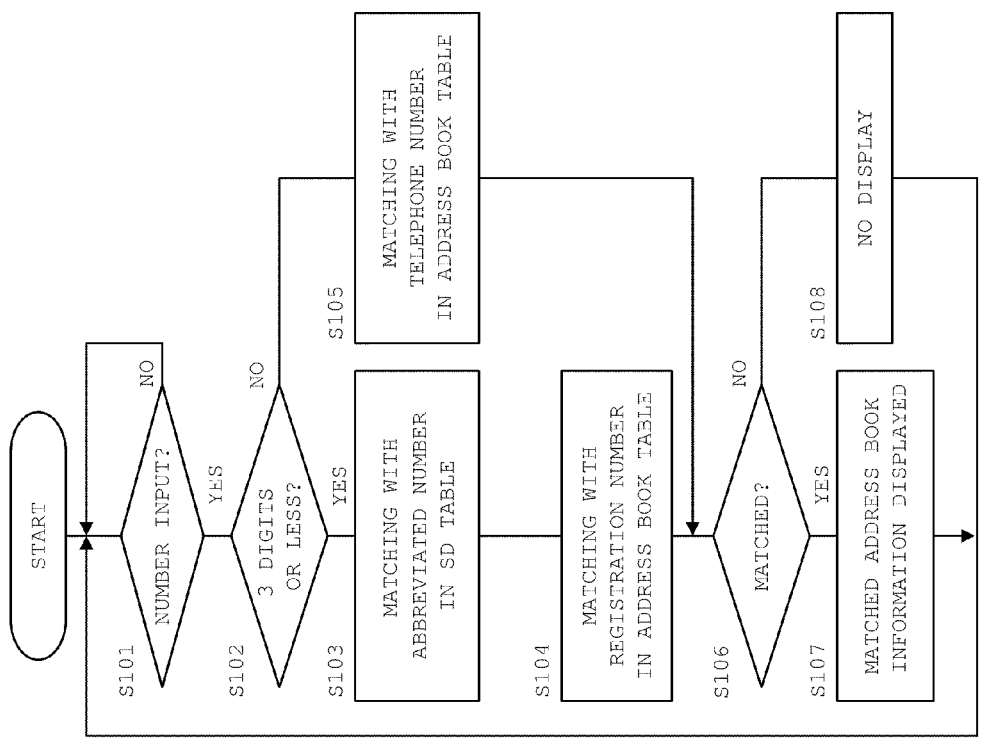
FIG. 4 is a flowchart showing an extraction process for extracting address book information in the embodiment.
Figure 5:
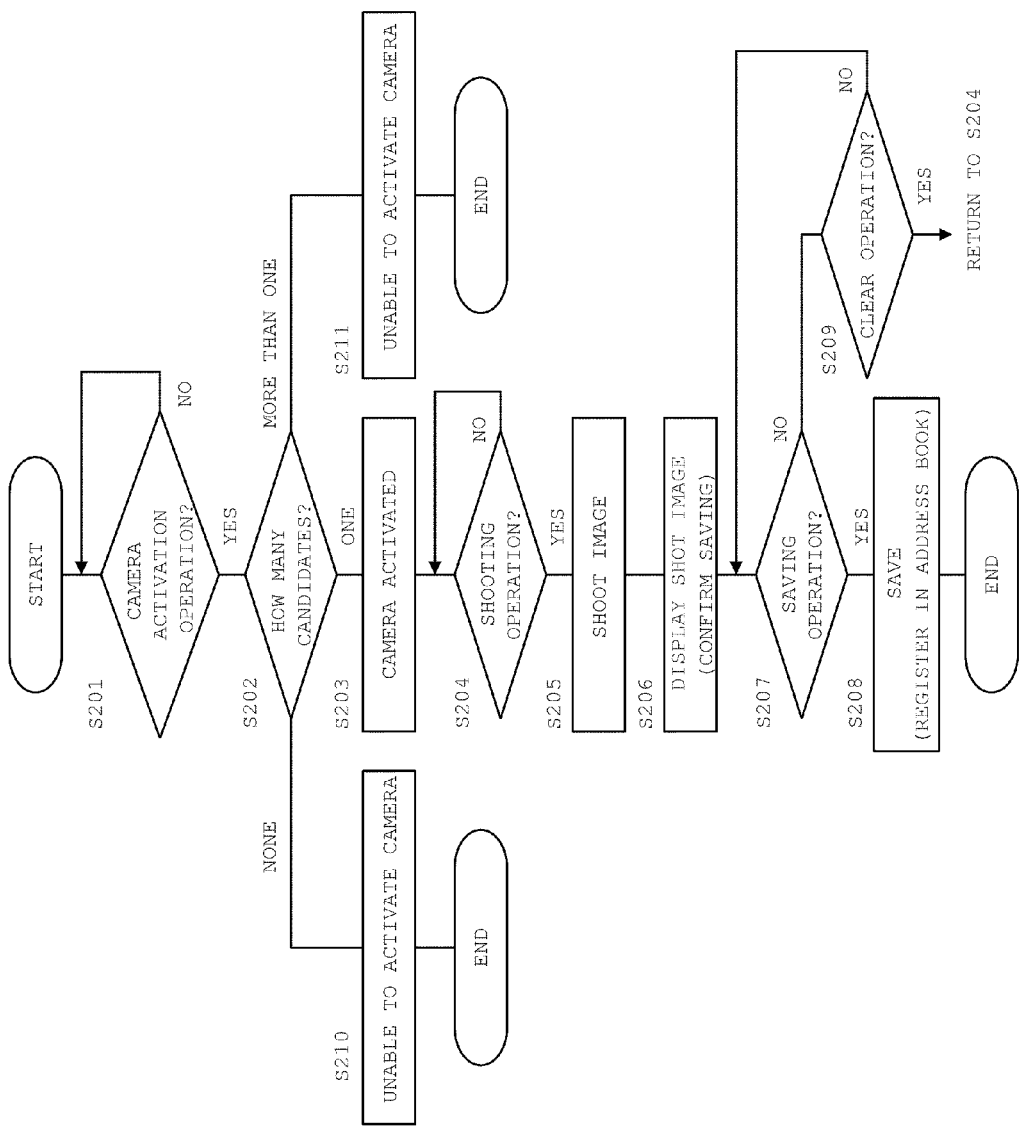
FIG. 5 is a flowchart showing an image registration process for registering an image in the address book information in the embodiment.
Figure 6:
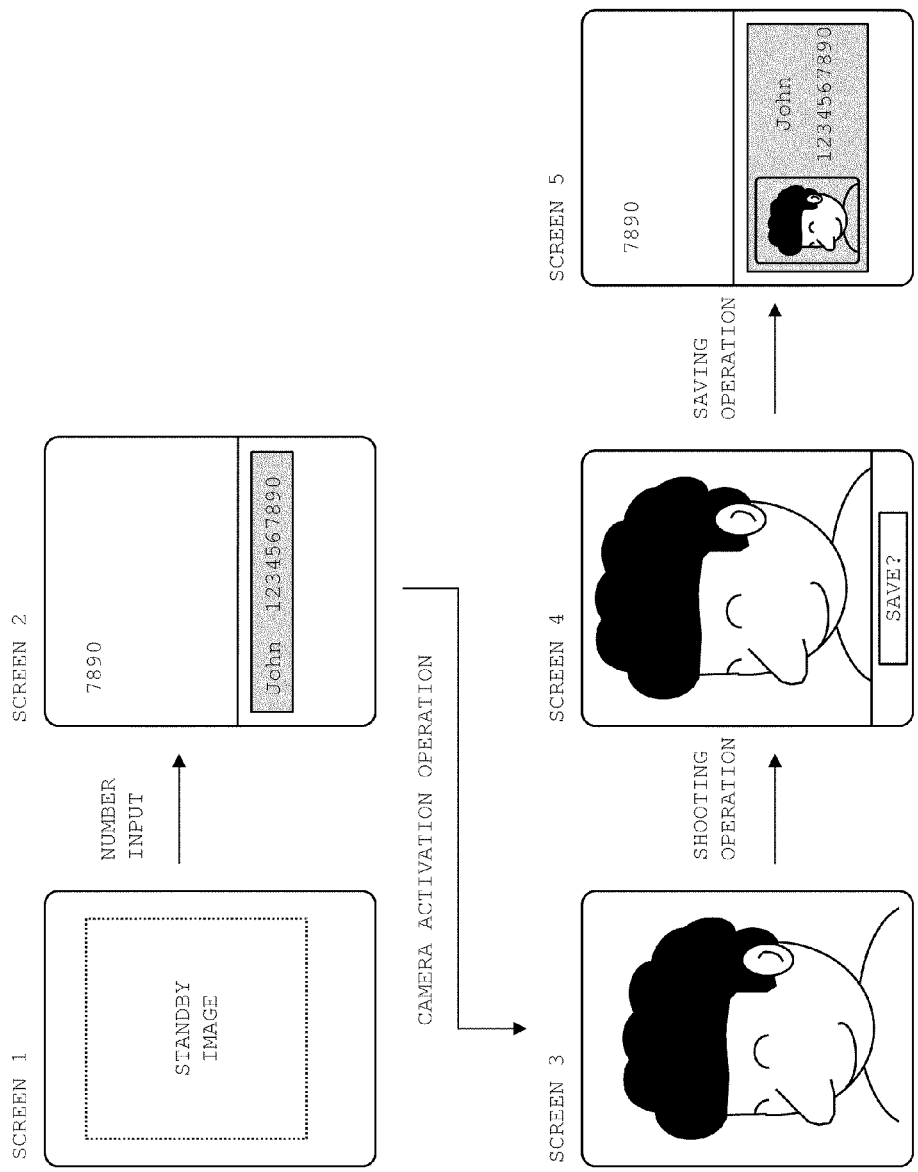
FIG. 6 is a diagram showing screen display examples showing a series of image registration processes for extracting address book information and then registering the image in the embodiment.

FIG. 4 is a flowchart showing an extraction process for extracting the address book information matched with the input from the user. FIG. 5 is a flowchart showing an image registration process for storing an image by correlating the image with extracted address book information. FIG. 6 is a diagram showing screen display examples in a series of image registering processes for registering the image by extracting the address book information.

In the present embodiment, the user can extract the desired address book information by using the telephone number, the registration number for registering a telephone number on the address book table, and the abbreviated number assigned for a telephone number. The user can input numbers using the number/character input keys when the mobile phone is in a standby mode that the liquid crystal panel 21 displays a standby display (screen 1 of FIG. 6).

In reference to FIG. 4, when a number is input by the user (S101: YES), the CPU 100 determines a digit of the number (S102). Then, when the digit is within 3 digits (S102: YES), the CPU 100 determines whether the number entered matches with the abbreviated number of the SD table and the registration number of the address book table (S103 and S104).

On the other hand, when the number is more than three digits (S102: NO), the CPU 100 determines whether the number entered matches with the telephone number of the address book table (S105).

Then, the CPU 100 displays the matched address book information, if any (S106: YES), on the liquid crystal panel 21 (S107), and waits for the next number input (S101). On the other hand, if there is no match (S106: NO), the liquid crystal panel does not display any address book information (S108), and the CPU 100 waits for the next number input (S101).

In this way, each time one number is input, the process with these steps from S101 to S108 is performed. Therefore, every time the user enters a number, the display is renewed until all the intended numbers to be input is entered, and the address book information which matches the numbers with the same digit of numbers eventually entered is displayed. For example, when last four digit of a telephone number is entered, as shown in a screen 2 of FIG. 6, names and telephone numbers (all numbers) of the address book information which matches the last four digits of the telephone number are displayed on a predetermined position of the screen.

Next, in reference to FIG. 5, a registration processing of images is explained. As shown in a screen 2 of FIG. 6, while the mobile phone is in a state displaying the address book information, and the mode key is pressed by the user, an activating operation of a camera mode is done (S201: YES), and the CPU 100 determines how many pieces of the address book information to be candidates of the image registration exist (S202).

The CPU 100 activates a camera (S203) when there is one candidate (S202: 1). Accordingly, as shown in a screen 3 of FIG. 6, the liquid crystal panel 21 displays a preview screen.

Then, the OK key is pressed by the user, a shooting operation is done (S204: YES), the CPU 100 performs the shooting (S205), and an image taken is displayed on the liquid crystal panel 21. At the same time, as shown in a screen 4 of FIG. 6, the CPU 100 displays a message which prompts the user to perform a saving operation (S206).

When the OK key is pressed by the user and the saving operation is done (S207: YES), the CPU 100 correlates image data of this image with extracted address book information and stores the data in a memory 105 (S208). At this time, the liquid crystal panel 21 displays the name, telephone number and the registered image as shown in a screen 5 of FIG. 6.

On the other hand, when the saving operation is not done by the user (S207: NO), and a clear operation is performed (S209: YES), the CPU 100 returns to a step S204 and waits for the shooting operation again.

In Step S202, when the CPU 100 determines that there is no candidate or there is a plurality of candidates (S202: none or a more than one), the CPU 100 does not activate the camera (S210, S211). Therefore, in this case, an image cannot be registered.

As described above, according to this embodiment, it is possible to register an image taken in an address book easily without activating the address book one by one in a conventional matter. That is, according to this embodiment, after information to extract the address book information (telephone number, etc.) for registering the image is input, a user can save the image associated with desired address book information, that is, can register the image in the address book only by activating a camera, shooting an image, and saving the shot image. As such, according to this embodiment, a registration operation to the address book can be extremely simplified, so the usability of the user can be improved.

Modification Example 1

In the above embodiment, at the processing flow of FIG. 4, if the number of extracted address book information candidates is more than one, the step progresses from the processing flow S202 to S211 of FIG. 5, and the activation of the camera is stopped. Thus, when a plurality of candidates for address book information was extracted, the image registration was not able to perform. In contrast, in the present modification, when the plurality of candidates of the address book information is extracted, the user can select the desired candidate.

Figure 7:
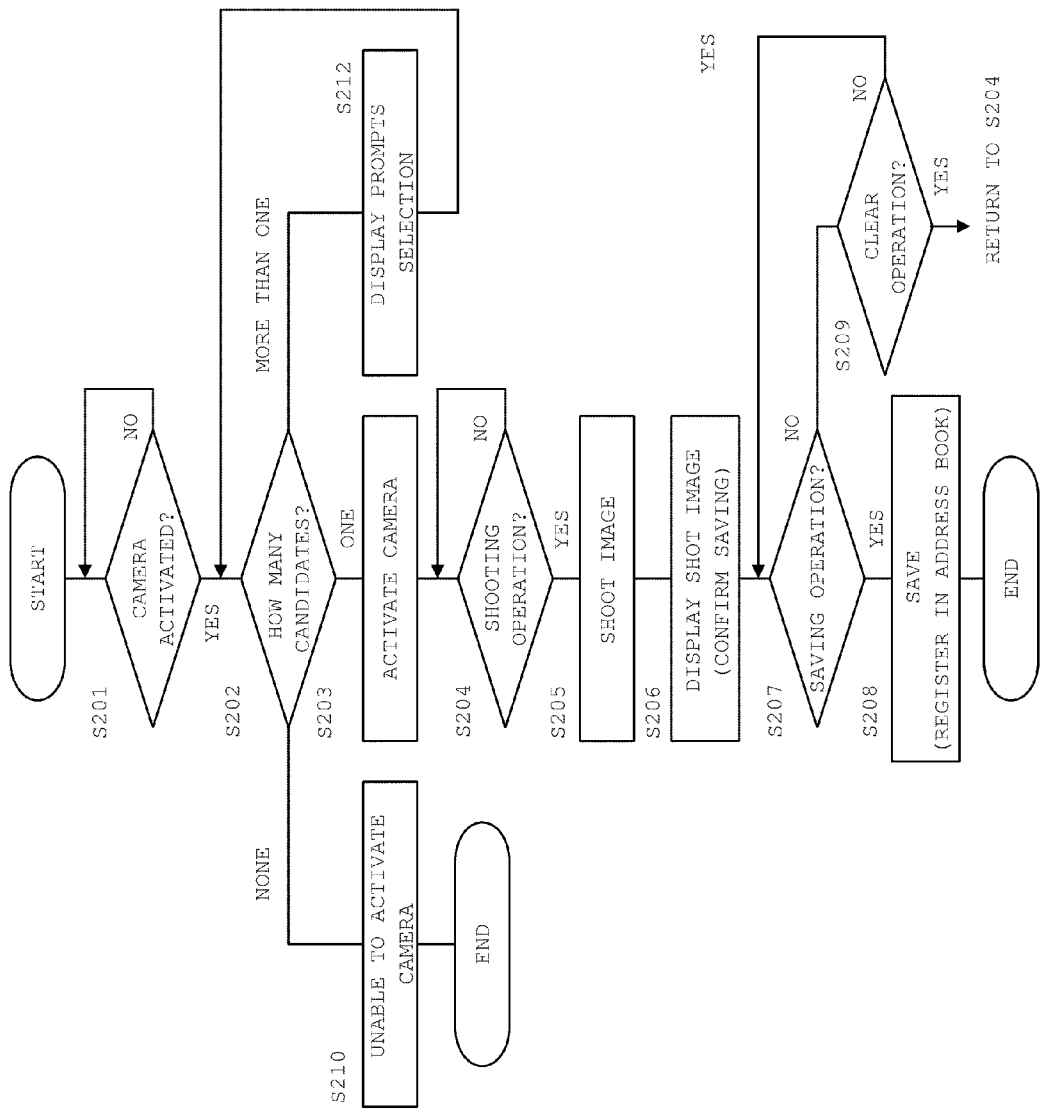
FIG. 7 is a flowchart showing an image registration process in a modification example 1.

FIG. 7 is a flowchart showing an image registration process in a modification example 1. In this flow chart, S211 of FIG. 5 is replaced with S212. That is, when it is determined that the number of candidates of the address book information is more than one in S202, the CPU 100 displays a message which prompts the user to select from the candidates (S212). Other processing steps are the same with the steps of FIG. 5.

Figure 9:
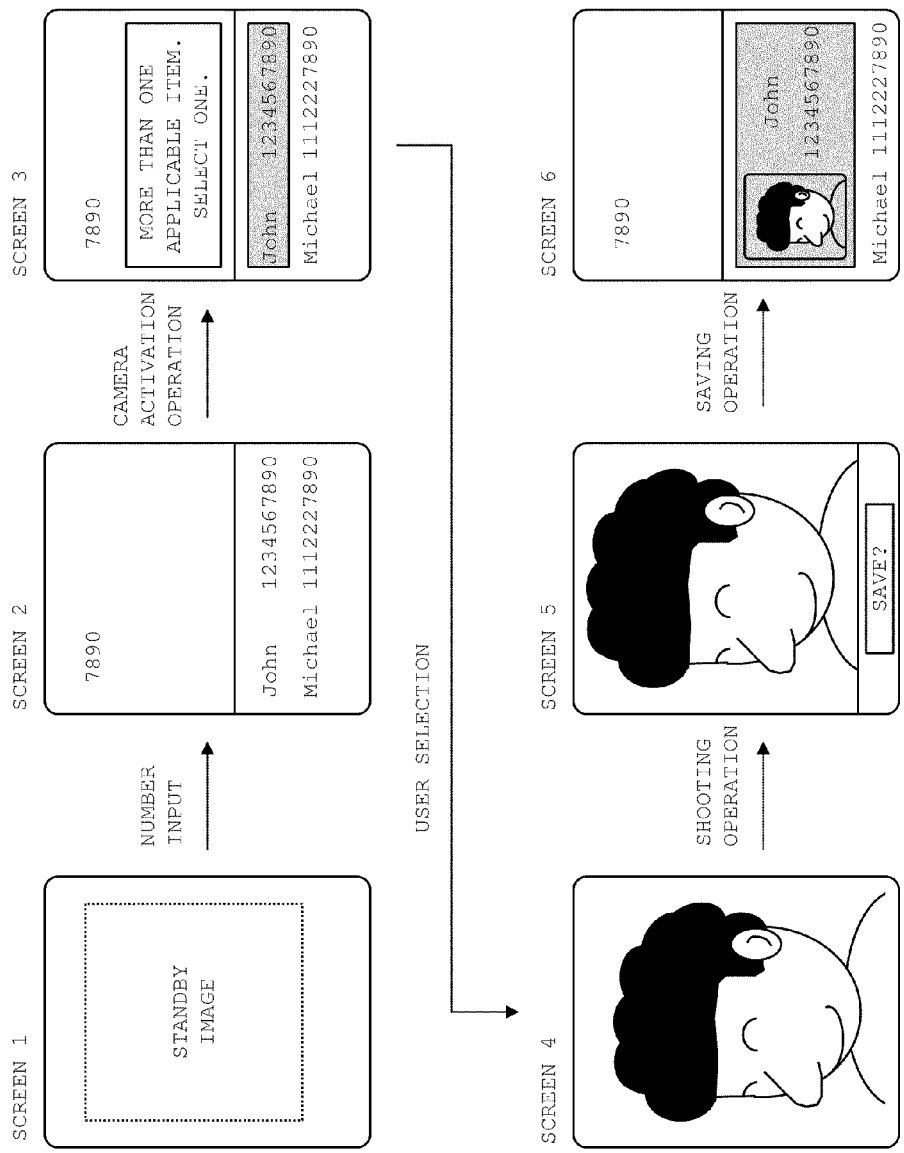
FIG. 9 is a diagram showing screen display examples in the series of image registration processes in the modification example 1.

For example, when more than one telephone numbers whose last 4 digits are the same with input numbers are registered in the address book, a plurality of candidates is displayed as in screen 2 of FIG. 9. In this state, if a camera activation operation is performed, a display prompting the user to select from the candidates is performed as shown in screen 3.

As a result, when the user selects the desired candidate, a determination in S202 of FIG. 7 becomes "1," and a flow moves to processes after S203. Accordingly, the image is registered with the address book information the user selected.

Figure 8:
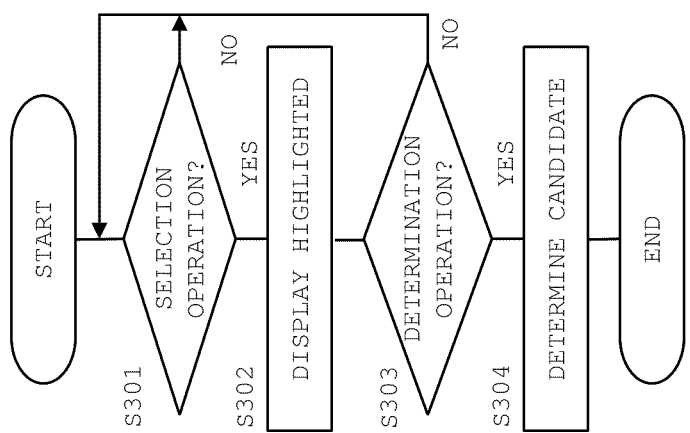
FIG. 8 is a flowchart showing a selection determination process for selecting and determining address book information in a modification example 1.

FIG. 8 is a diagram showing a process flow for selecting and determining the address book information.

In S301, the CPU 100 determines whether the selection operation by the user has been done or not. When the user performs the selection operation using a move key, the CPU 100 determines that the selection operation is done, and for example, as shown in a screen 3 of FIG. 9, the selected address book information candidate is highlighted (S302). After that, when the user performs a determination operation by pressing the OK key (S303: YES), the CPU 100 determines the highlighted candidate as an image registration candidate (S304). As a result, the address book information candidates can be narrowed down to one.

The process flow of FIG. 8 can be performed as needed according to the operation by the user not only after the camera is activated but also before the camera is activated. For example, in a state of a screen 2 of FIG. 9, if the user performs the selection operation, S301 of process flow of FIG. 8 becomes YES, and the processes after S302 are performed. When the activation operation of the camera is done after the candidate is selected according to the above processes, at the S202 of FIG. 7, it is determined that there is one candidate, and the processes after S203 are performed.

According to a structure of the above modification example 1, when the plurality of address book information is extracted, the user can select the desired address book information and register the image. Therefore, user-friendliness improves further.

Modification Example 2

In the above modification example 2, the extraction process of the address book information is changed compared to the above embodiment and the modification example 1. That is, in the above embodiment and the modification example 1, the address book information is extracted by matching the telephone numbers, registration numbers used when the telephone numbers are registered in the address book table, and abbreviated numbers assigned to the telephone numbers with the input number.

On the other hand, in the modification example 2, the address book information is extracted by performing predetermined key operation. In concrete, by performing the predetermined key operation, either address book information that an image is already registered or address book information that an image is not yet registered is extracted. The term key operation here can be a special key operation such as, for example, pressing and holding a key (any key from the numeric key portion 11 or the main key portion 23) or pressing two or more keys at the same time.

In the modification example 2, a plurality of address book information is normally extracted. For this reason, when the registration of an image is performed, the image registration process (FIG. 7) and a candidate determination process (FIG. 9) of the modification example 1 are performed.

Figure 10:
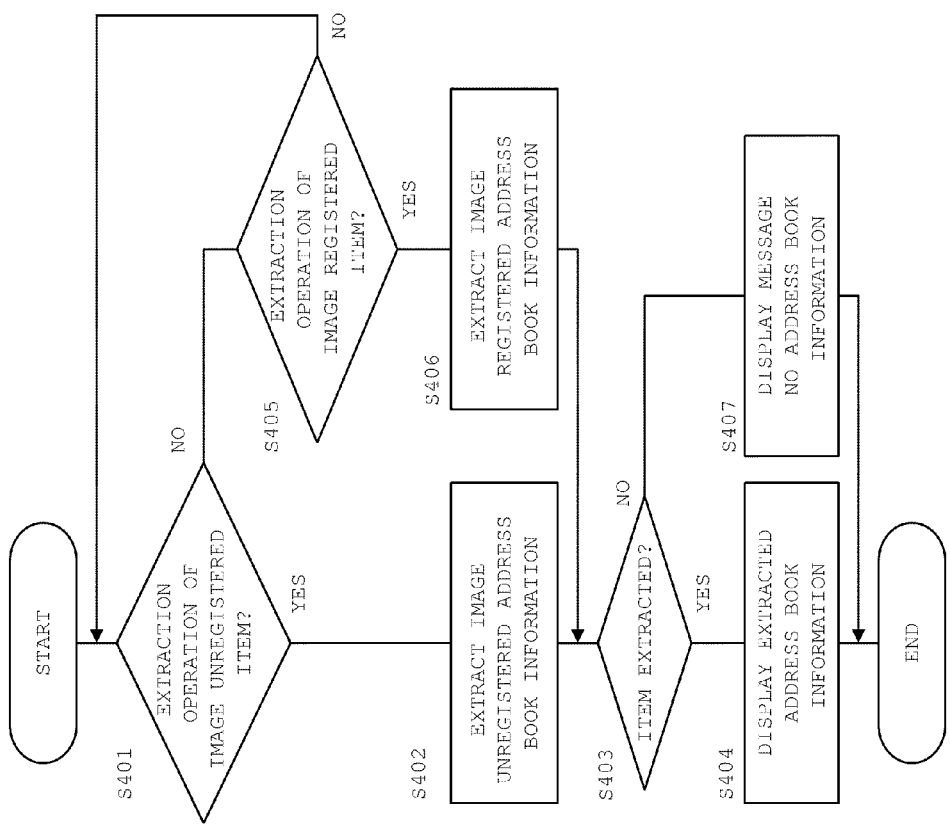
FIG. 10 is a flowchart showing an extraction process of address book information in a modification example 2.

FIG. 10 is a flowchart showing an extraction process of the address book information in a modification example 2. FIG. 11 is a diagram showing screen display examples in the modification example 2.

In reference to FIG. 10, when the key operation to extract the address book information with no image registered is done by the user (S401: YES), the CPU 100 refers to a section of ID numbers of address book table (see FIG. 3(a)), and extracts the address book information without an ID number (S402). Then, when the address book information is extracted (S403: YES), the CPU 100 displays the extracted address book information on the liquid crystal panel 21 (S404). For this process, for instance, as shown in FIG. 11(a), names and telephone numbers of each item whose image is not yet registered are displayed.

In contrast, when the key operation to extract the address book information that the image is already registered is performed by the user (S405: YES), the CPU 100 refers to the section of the ID numbers of the address book table, and extracts the address book information with the ID number (S406). Then, when the address book information is extracted (S403: YES), the CPU 100 displays the extracted address book information on the liquid crystal panel 21 (S404). For this process, for instance, as shown in FIG. 11(b), names and telephone numbers of each item whose image is already registered are displayed with the images.

When the CPU 100 determines that there is no extracted address book information in the step S403, it performs display showing such a state (S407).

As such, according to the construction of the modification example 2, the user can extract the address book information without image registration, select the desired information among them, and register an image. Also, the user can extract the address book information with image registration, select the desired information among them, and renew an image.

Modification Example 3

In the above embodiment, modification 1 and 2, the address book information extracted from the address book is displayed before the camera is activated, but in this modification example, the extracted address book information is not displayed even when the user performs the number input. In the present modification example, after the number is input, as a series of actions, the camera activation operation is assumed to be performed.

Figure 12:
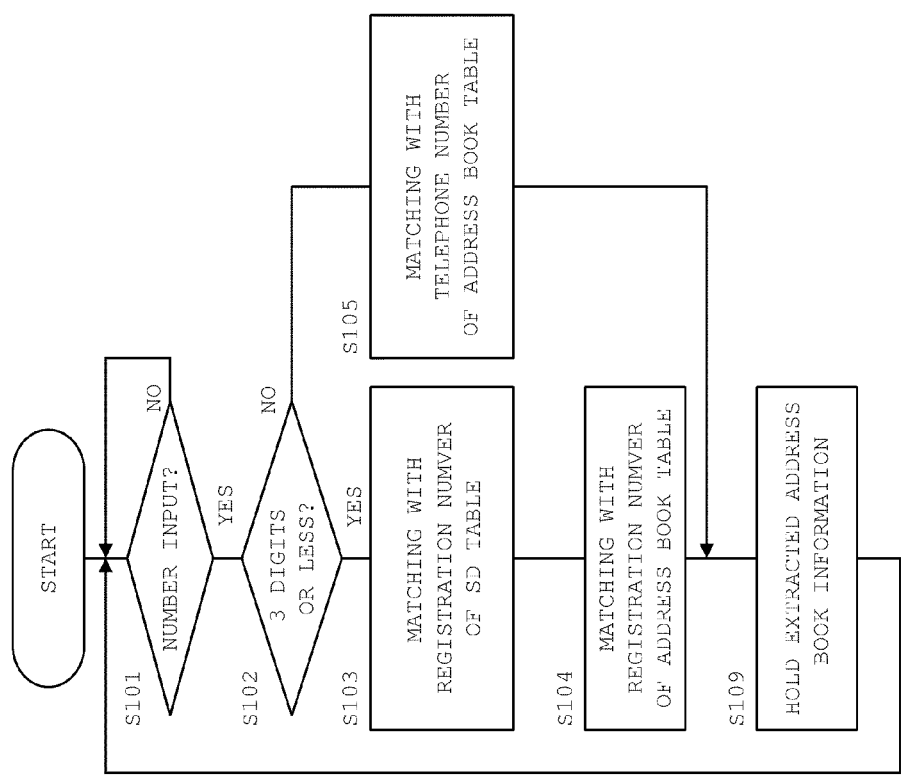
FIG. 12 is a flowchart showing the extraction process of address book information in a modification example 3.

FIG. 12 is a flowchart showing the extraction process of the address book information in a modification example 3.

In a process flow of FIG. 12, instead of steps from S106 to S108 of FIG. 4, a process of a step S109 is performed. That is, the CPU 100 does not display the extracted address book information on a liquid crystal panel 21, but the CPU 100 holds the address book information to use for the image registration process later (S109). In this case, only the numbers input by the user are displayed on the liquid crystal panel 21 as shown on a screen 2 of FIG. 15.

Figure 13:
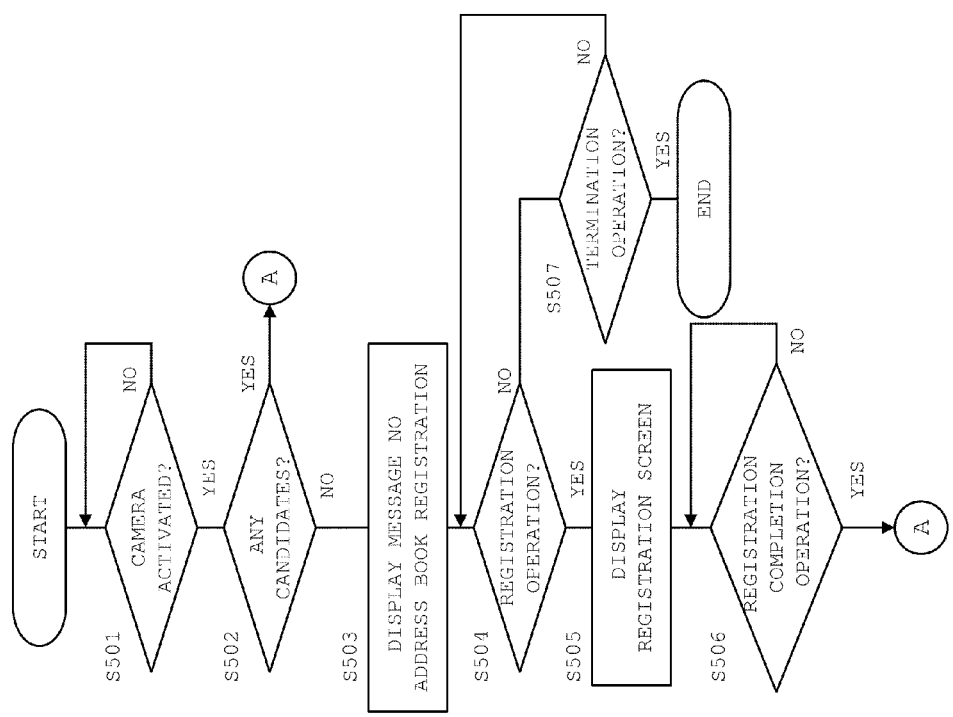
FIG. 13 is a flowchart showing an image registration process in the modification example 3.
Figure 14:
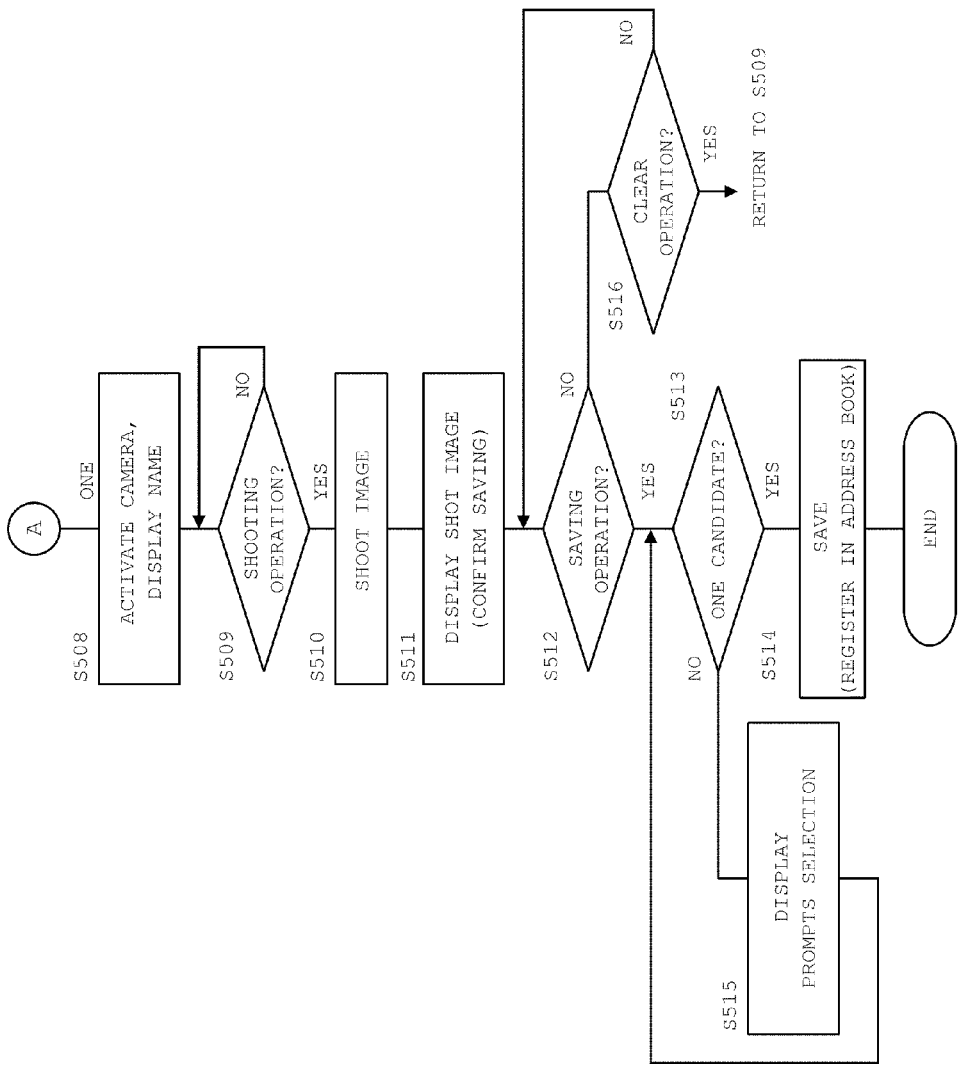
FIG. 14 is a flowchart (continued from FIG. 13) showing the image registration process in the modification example 3.

FIG. 13 and FIG. 14 are flowcharts showing an image registration process in the modification example 3.

When a camera is activated by a user (S501: YES), the CPU 100 determines whether the address book information is extracted or not, and whether a candidate exits or not (S502). Then, when there is a candidate (S502: YES), a camera is activated, and the address book information to be a candidate is displayed on a preview screen (S508). With this process, for example, as shown in a screen 5 of FIG. 15, a preview screen with a name added is displayed. The user can check if there is an error to the registration destination of the image by checking the name displayed. The telephone numbers can be displayed along with the names.

Figure 15:
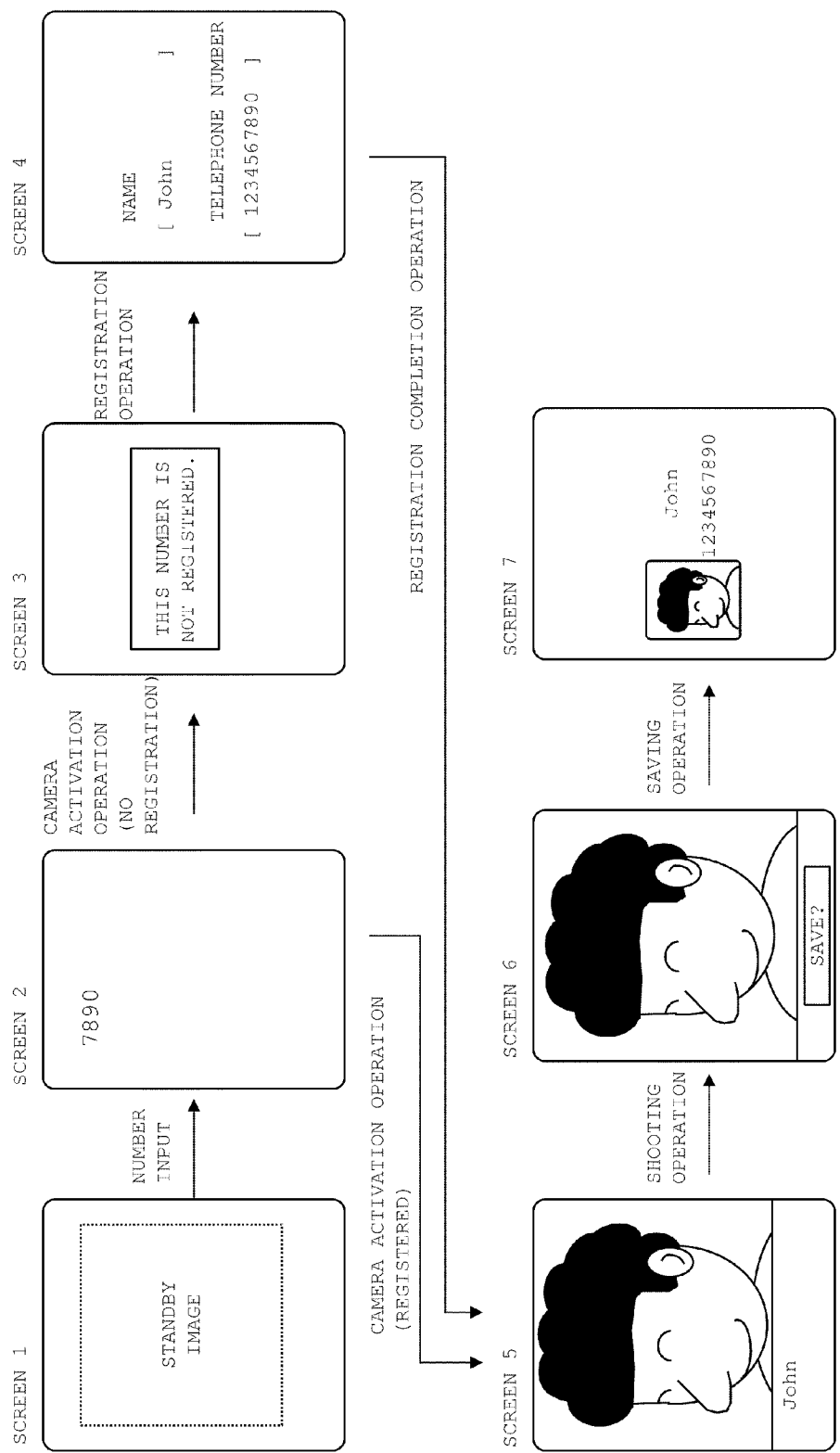
FIG. 15 is a diagram showing screen display examples in the series of image registration processes in the modification example 3.

On the other hand, when the address book information is not extracted and there is no candidate (S502: NO), the CPU 100 displays a message saying there is no address book information matching the number input (S503). With this process, for instance, a display shown in a screen 3 of FIG. 15 is done.

As a result, the user can newly perform an address book information registration. When keys assigned for the address book information registration are operated by the user (S504: YES), CPU 100 displays a screen for registration (S505). With this process, for instance, a registration screen as shown in a screen 4 of FIG. 15 is displayed. The user can register a name and a telephone number on this screen. When keys assigned for registration completion is operated by the user (S506: YES), the CPU 100 activates the camera (S508). Also at this time, the newly registered name is displayed on a preview screen.

After that, when the user performs a shooting operation (S509: YES), the CPU 100 performs a shooting process (S510), then a shot image is displayed on a liquid crystal panel 21, and the CPU 100 displays a message which prompts the user to perform a saving operation as in a screen 6 of FIG. 15 (S511). Then, when the saving operation is performed by the user (S512: YES), the CPU 100 determines whether the number of the candidates is one or not (S513). When the number of the candidates is one (S513: YES), image data of the image taken is correlated with the address book information and is stored in a memory 105 (S514). At this time, the name, telephone number, and registered image are shown on the liquid crystal 21 as shown in a screen 7 of FIG. 15.

When the saving operation is not performed in step S511 (S512: NO), and a clear operation is performed (S516: YES), the CPU 100 returns to the step S509 and awaits the saving operation again.

Figure 16:
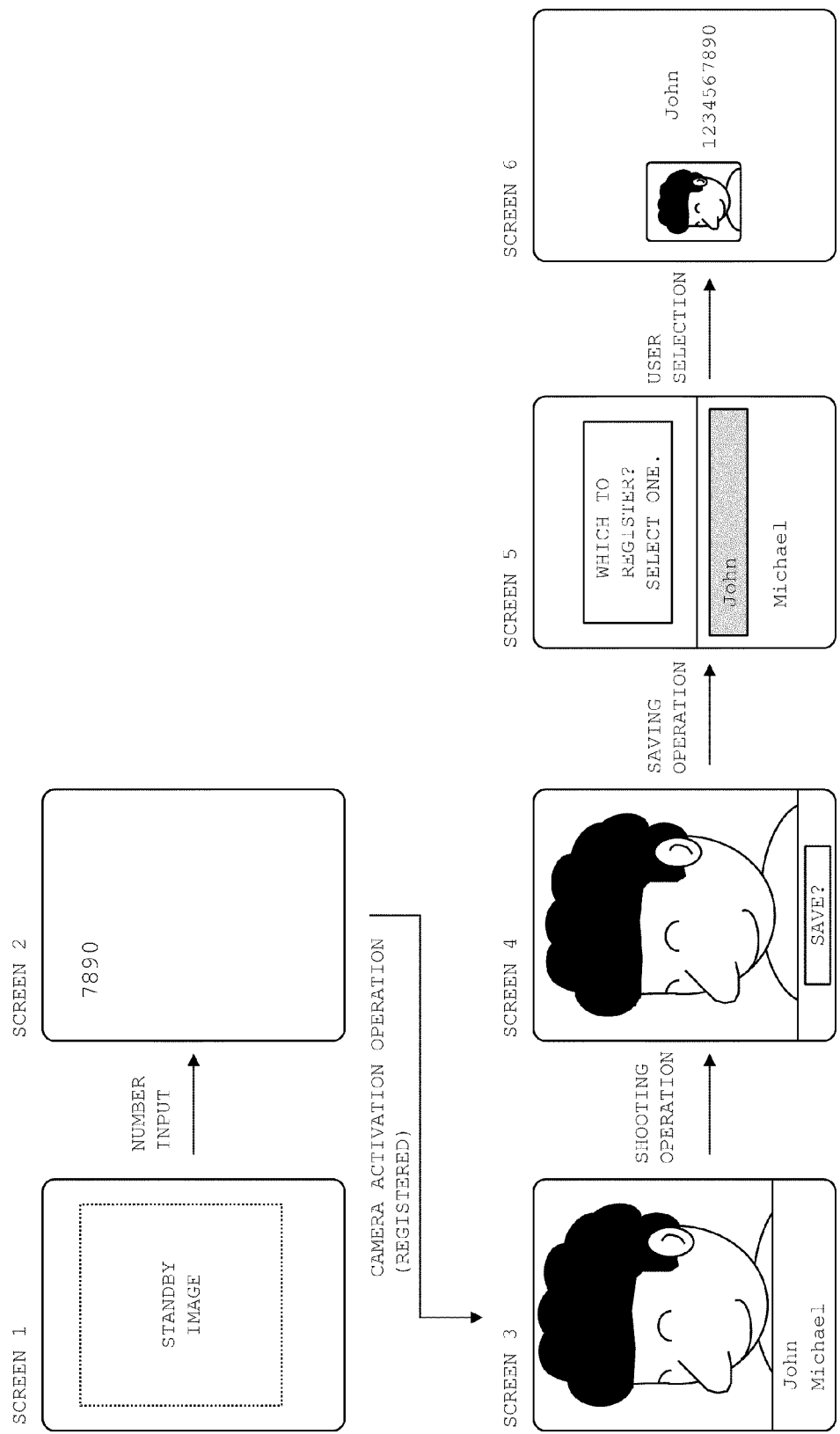
FIG. 16 is a diagram showing the screen display examples in the series of image registration processes in the modification example 3.

When a plurality of address book information is extracted and a plurality of candidates exists, the plurality of the address book information (names) is displayed on the preview screen as on a screen 3 of FIG. 16 at the time the camera is activated. In this case, the CPU 100 determines that the number of candidates is not just one at the step S513, and a message which prompts the user to select a registration destination as shown on a screen 5 of FIG. 16 (S515). Based on this display, the user performs a selection operation, a candidate determination process flow of FIG. 8 is performed, and the registration destination is determined. As a result, at step S513, it is determined that the number of candidates is only one, and image data of the taken image is correlated with determined address book information and stored in the memory 105 (S514).

As described above, according to a construction of a modification example 3, it is possible to perform a flow from a number input to a camera activation with a series of operations. In this case, even if the number input is performed, extracted address book information is not displayed, instead, since the address book information is displayed when the camera is activated, the user can check whether there is an error to the registration destination of the image or not.

Further, according to the modification example 3, even when there is no address book information matching the input, new address book information can be registered and the image can be stored by correlated with the information. Thus, user-friendliness improves further.

Modification Example 4

The present modification example is to provide telephone number information matching the previous and next numbers of the input number as candidates when there is no desired information among the candidates of extracted telephone number information. That is, a function to scroll back and forth the candidates of the telephone number information is newly added.

Figure 17:
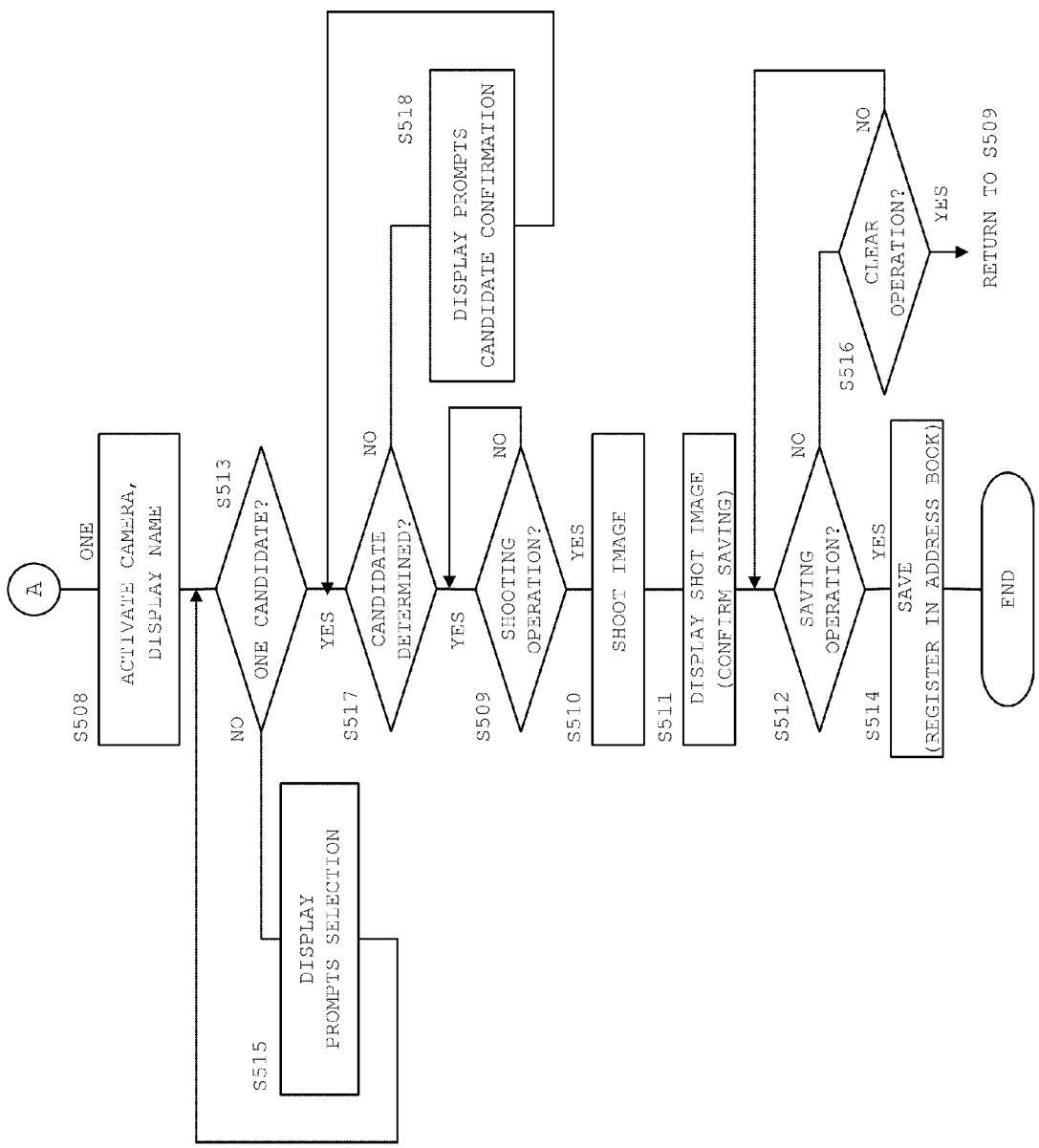
FIG. 17 is a flowchart (continued from FIG. 13) showing an image registration process in a modification example 4.

FIG. 17 is a flowchart showing an image registration process in a modification example 4.

When the camera is activated (S508), it is determined whether the number of the candidates of extracted address book information is one or more (S513). When there is a plurality of candidates (S513: NO), for example, as in a screen 1 of FIG. 19(a), the CPU 100 shows a display to make the user select one candidate (S515). Based on this, when a selection operation is done, in a candidate determination process of FIG. 18, processes of steps from S301 to S304 explained in FIG. 8 are done, and one candidate is determined. As a result, in a step S513, it is determined that there is one candidate, further in a step S517, it is determined that the candidate is determined, and in a step S509, it is in a state to wait for a shooting operation. At this time, as in a screen 2 of FIG. 19(a), the determined address book information is displayed.

In contrast, when the number of extracted address book information candidates is one, the CPU 100 determines that there is one candidate in the step S513. Then, secondly, the CPU 100 determines whether or not the candidate is determined in the step S17. At this time, since a determination operation is not done by the user, a determination in S517 becomes NO, and a message, as in a screen 1 of FIG. 19(b), which prompts the user to confirm the candidate is displayed.

The user checks the displayed address book information (for example, the name). For instance, when the user inputs the registration number, the user might input the previous or next registration number by mistake. Then, the user scrolls down or up the screen with the move key when the user determines that the address book information is incorrect.

Figure 18:
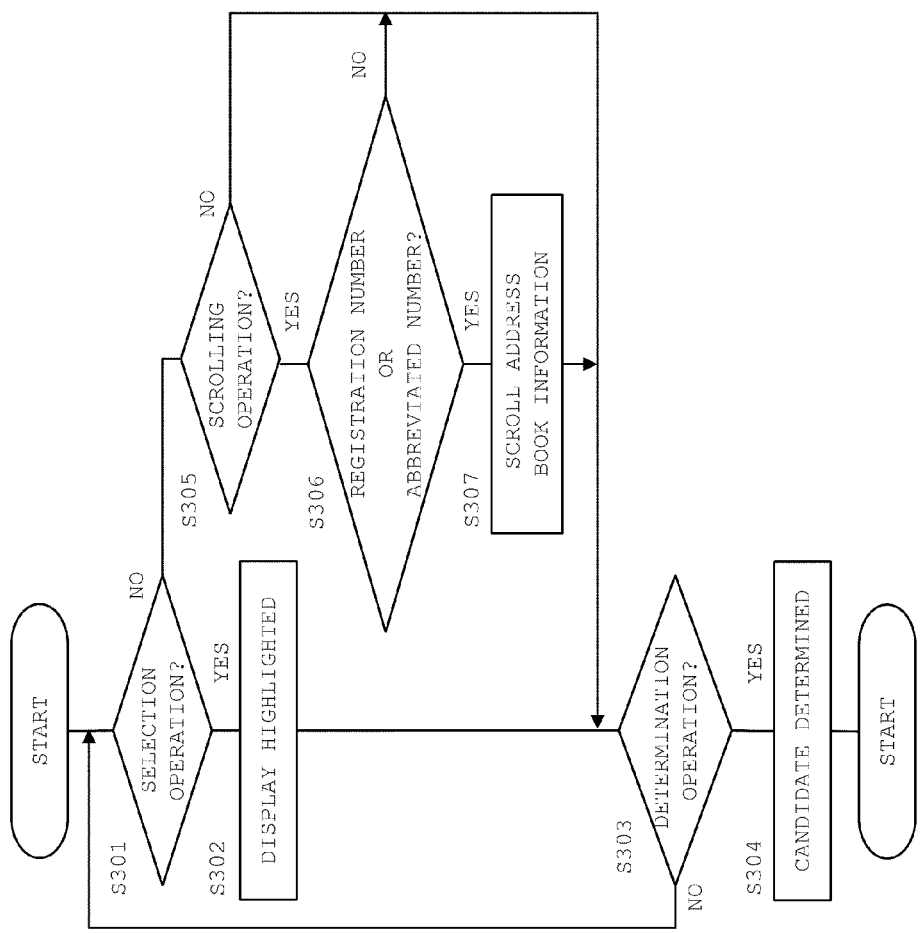
FIG. 18 is a flowchart showing a selection determination process in the modification example 4.

At this time, the CPU 100 is monitoring whether or not the scrolling operation was conducted (S305) at the candidate determination process of FIG. 18, and according to the operation of the move key, the CPU 100 determines that there is a scrolling operation (S305: YES). When the number input by the user is a registration number or an abbreviated number (S306: YES), the user renews the input number with another number by counting up or down according to the scrolling operation, then the address book information with the renewed number is extracted and displayed (S307).

Figure 19:
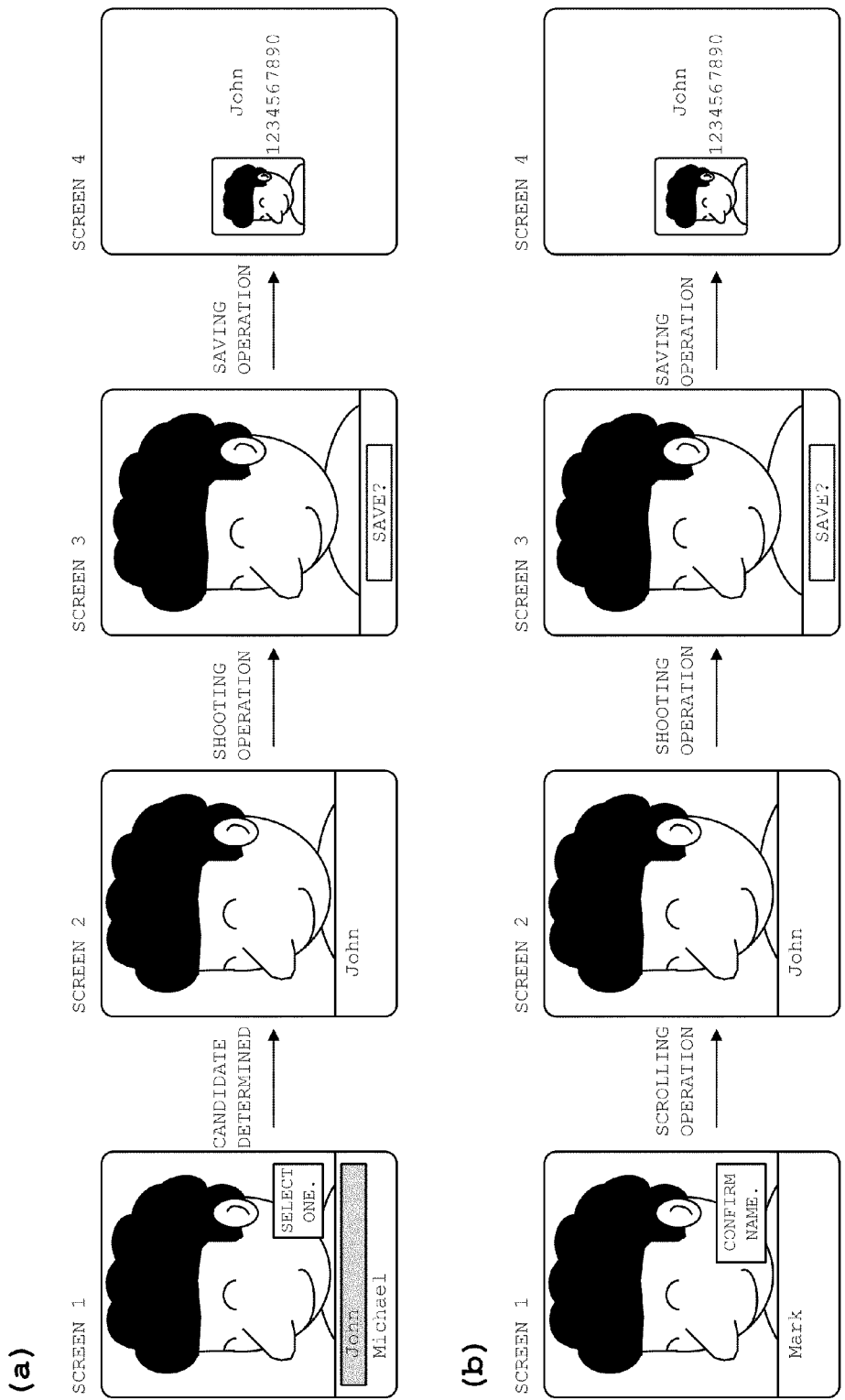
FIG. 19 is a diagram showing image display examples in the series of the image registration process in the modification example 4.

As a result, as in screen 2 of FIG. 19(b), when a determination operation is performed by the user in a state that the correct address book information is displayed, the CPU 100 determines the candidate (S304). Also, when the address book information contains no error, and the user performs the determination operation without any other action, the CPU determines the candidate (S304).

Accordingly, in Step S517 of FIG. 17, it is confirmed that the candidate is determined, and the CPU 100 is in a state for waiting the shooting operation in step S509.

As described above, according to the construction of the modification example 4, even when the user inputs an incorrect abbreviated number or registration number, the number can be corrected to correct address book information by checking the address book information before the image is registered. Thus, user-friendliness improves.

Modification Example 5

Figure 20:
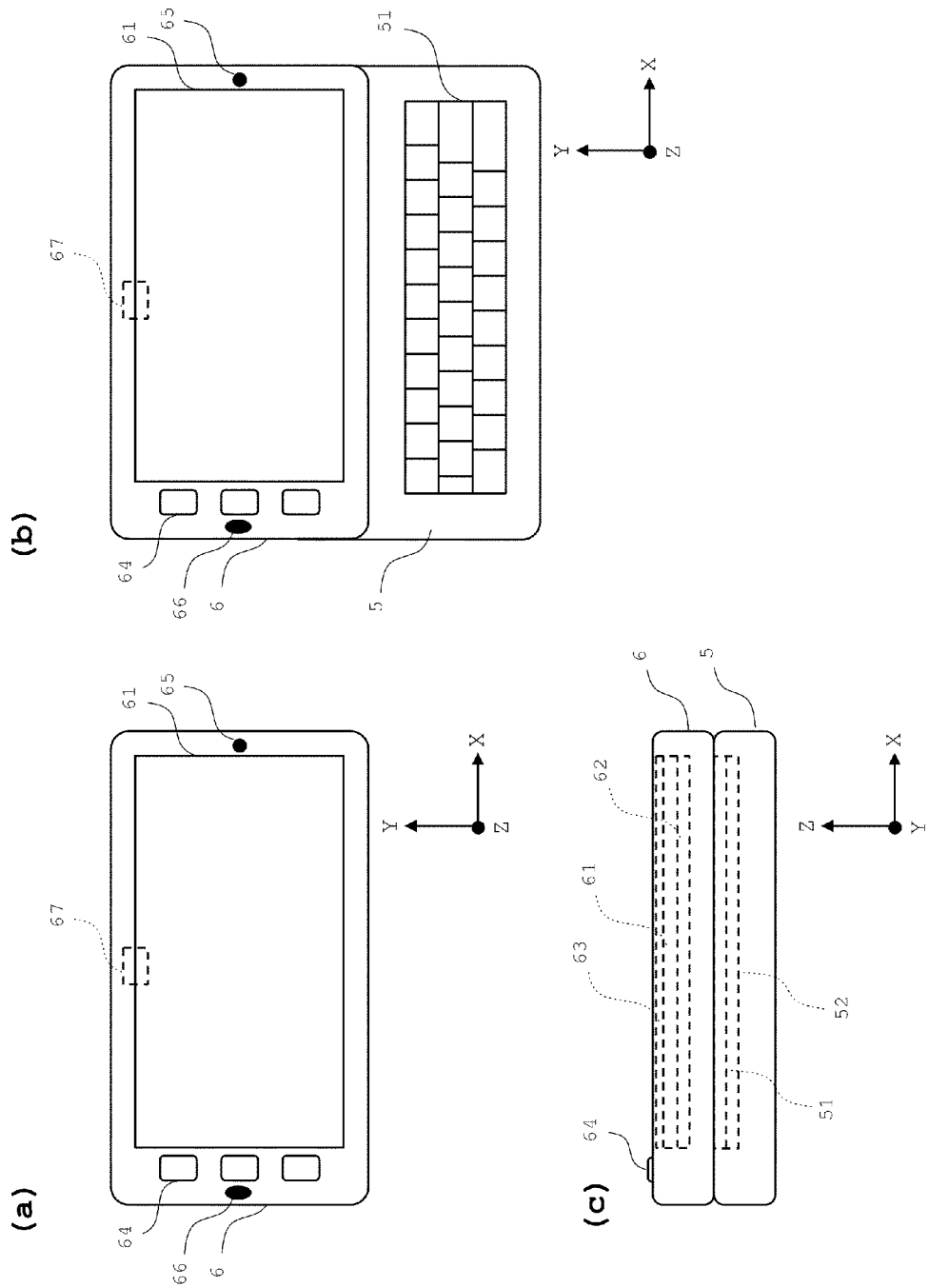
FIG. 20 is a diagram showing an external configuration of a PDA in a modification example 5.

FIG. 20 is a diagram showing a structure of a PDA in a modification example 5. The PDA comprises a first cabinet 5 and a second cabinet 6. Both the first cabinet 5 and the second cabinet 6 have rectangular shapes which are long in an X axial direction of FIG. 20(a).

The first cabinet 5 comprises a keyboard 51 comprises input keys for characters (Japanese syllabary characters and alphabets, etc.) and numeric keys, etc. Behind the keyboard 51, a backlight device 52 (hereinafter, referred to as "key backlight") is disposed. Since the key backlight 52 provides light to the keyboard 51, the user can see signs displayed on each key even when the surroundings are dark.

The second cabinet 2 comprises liquid crystal panel 61 which has a shape of horizontally long rectangle, and its display surface is facing the front. Behind the liquid crystal panel 61, a backlight device 62 (hereinafter, referred to as "panel backlight 62") is disposed. The panel backlight 62 provides light to the liquid crystal panel 61.

On the front surface of the liquid crystal panel 61, a touch panel 63 is disposed. Besides, on the side of the liquid crystal panel 61 on the second cabinet 6, three sub keys 64 are disposed. Further, on the both, right and left, edges of the second cabinet 6, a microphone 65 and a speaker 66 are disposed respectively.

A camera module 67 is arranged inside of the second cabinet 6. A lens window (not shown) of the camera module 67 is exposed from the back surface of the second cabinet 6, and from this lens window, the image of the subject is taken into the camera module 67.

The second cabinet 6 is connected to the first cabinet 5 by a slide mechanism section (not shown) in such a manner as to be slidable in a direction of a Y axis shown in FIG. 20(a).

In a state the second cabinet 6 is closed, the second cabinet 6 lies almost completely over the first cabinet 5, as shown in FIG. 20 (a). In this state (closed state), entire keyboard 51 is hidden behind the second cabinet 6. Even when the keyboard is hidden in this way, telephone calls and other predetermined function mode can be operated by the touch panel 64 or sub keys 65.

When the second cabinet 6 is fully opened, the entire keyboard 51 is externally exposed as shown in FIG. 20(b). For the reason above, an operation of the function mode using the keyboard 51 is possible.

When the user talks on the phone, the user holds the PDA in a state the second cabinet 6 is completely closed, the side with microphone 65 comes to the mouth, and the side with speaker 66 comes to the ears.

Figure 21:
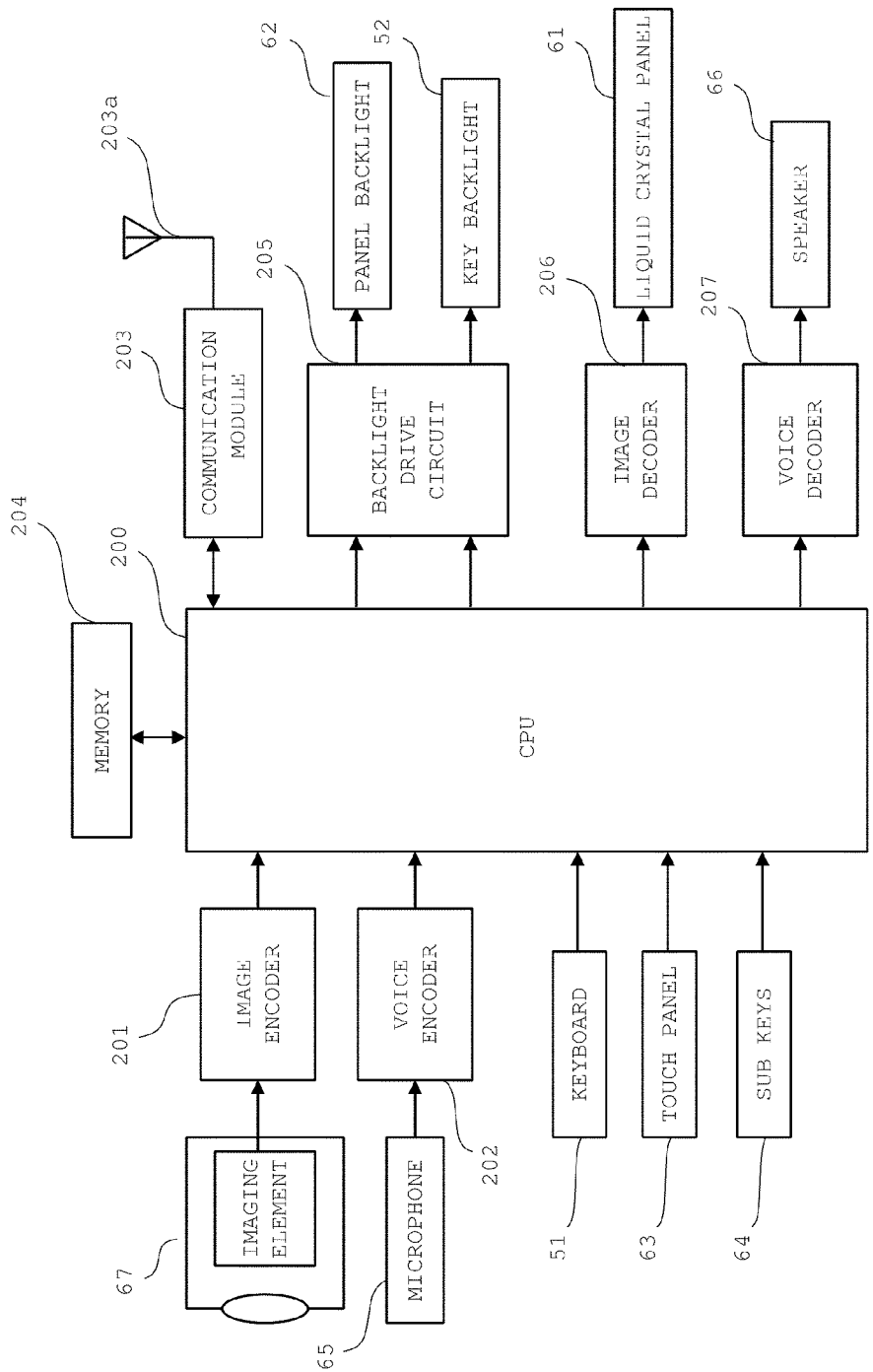
FIG. 21 is a block diagram sowing an entire configuration of the PDA in the modification example 5.

FIG. 21 is a block diagram showing an entire configuration of the PDA in the modification example 5. The PDA of the present embodiment, other than the above construction elements, comprises a CPU 200, an image encoder 201, a voice encoder 202, a communication module 203, a memory 204, a backlight drive circuit 205, an image decoder 206 and a voice decoder 207. This structure is similar to the structure shown in FIG. 2 including a CPU 100, an image encoder 101, a voice encoder 103, a communication module 104, a memory 105, a backlight drive circuit 106, an image decoder 107 and a voice decoder 108. Also, the structure of a camera module 67, a microphone 65 and speaker 66 is similar to the structure of a camera module 24, a microphone 102 and a speaker 109 shown in FIG. 2. Besides, an address book table and SD table shown in FIG. 3 are also stored in the memory 204.

Figure 22:
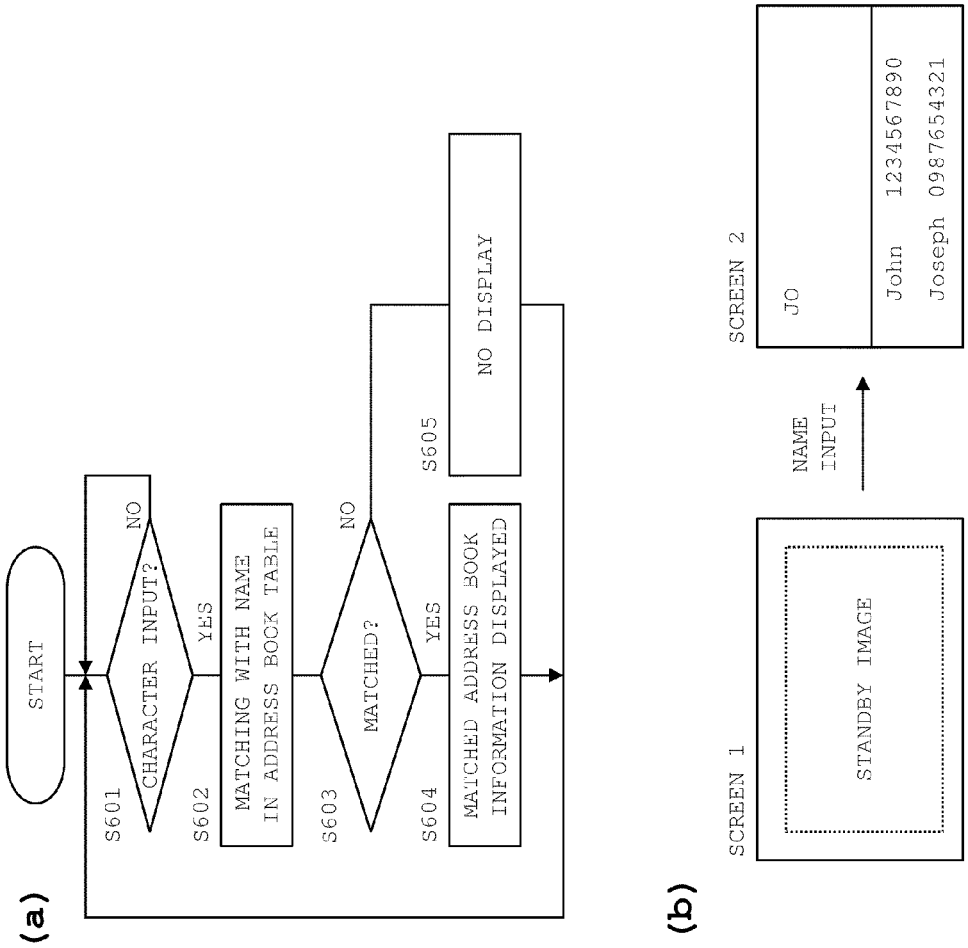
FIG. 22 is a diagram for describing an extraction process of address book information in the modification example 5.

FIG. 22 is a diagram for explaining an extraction process of address book information in a modification example 5. FIG. 22(a) is a flowchart of the extraction process, and FIG. 22(b) is screen display examples of when the extraction process is performed.

The PDA of the present modification example extracts the address book information by names. When the registration of an image is performed, an image registration process of the above embodiment, modification examples 1 and 3 (FIGS. 5, 7, 13 and 14) and a candidate determination process (FIG. 9) are performed.

The user can input characters using the keyboard 51 when the mobile phone is in a standby mode that the liquid crystal panel 61 displays a standby display (a screen 1 of FIG. 22(b)).

In reference with FIG. 22, when a character (alphabet) is input by the user (S601: YES), the CPU 200 matches the input character with the names in the address book table (S602).

When there is matched address book information (S603: YES), the CPU 200 displays the matched information on the liquid crystal panel 21 (S604) and waits for the next number input (S601). On the other hand, when there is no matched information (S603: NO), the CPU 200 does not display any address book information on the liquid crystal panel 21 (S605) and waits for the next number input (S601).

As such, every time a character is input, a process of these steps from S601 to S605 is performed. Therefore, every time the user enters a character, the display is renewed until all the intended characters to be input is entered, and the address book information which matches the characters with the same number of characters eventually entered is displayed. For example, when first two characters of a name are entered, as shown in a screen 2 of FIG. 22(b), names and telephone numbers (all numbers) of the address book information which matches the two characters are displayed on a predetermined position of the screen.

Thus, according to the construction of the modification example 5, an extraction of the address book information by names can be performed. In the construction of the modification example 5, the telephone book information can be extracted by using both characters (names) and numbers (abbreviated numbers, registration numbers and telephone numbers) by executing the extraction process by using numbers of FIG. 4 in parallel with executing the extraction process by using characters. Further, the extraction process of extracting items with and without an image registered in FIG. 10 can also be performed in parallel with above two extraction processes, and the address book information can be extracted by an operation which extracts an item with or without the image registered.

<Others>

The embodiment of the present invention can also be modified further in various manners other than those described above.

For instance, on a preview screen when a camera is activated, a human shaped frame shown in FIG. 23(a) can be displayed. By shooting a subject to fit the human shaped frame, an image with an appropriate position and size can be shot. The frame can be any other shape besides the human shape.

Also, as shown in FIG. 23(b), the shot image can be stored with additional information (company names, departments, birthdays, etc.) relating to the subject. This additional information can be one of the address book information registered on the address book table. This allows the user to refer the additional information when the user sees the image.

Although in the above embodiments, the camera is activated after the address book information is extracted, and the image shot by this camera is stored (registered in the address book) in the memory 105 by correlating the image with the extracted address book information, the present invention is not limited by this arrangement. An image which is already stored in the memory 105 can be read out after the address book information is extracted, and this image can be correlated with the extracted address book information and stored in the memory 105 (registered in the address book) again.

Besides, the embodiments of the present invention may be appropriately modified in various manners within the scope of technical ideas recited in the claims.

What is claimed is:

1. A communication terminal device, comprising:
   a display portion;
   a camera portion for capturing an image of a subject;
   a memory portion for storing address book information comprising one or more records, wherein each of the one or more records comprises a name and a telephone number;
   an input portion for performing an input of a number string comprising one or more digits; and
   one or more modules that are configured to,
      once a predetermined number of digits in a number string are input, after each digit is input, determine if the number string matches a telephone number of at least one of the one or more records of the address book information,
      if it is determined that the number string matches a telephone number of at least one record, display the name from the at least one record, and,
      if it is determined that the number string does not match a telephone number of at least one record,
         display an indication that the number string does not match a telephone number of at least one record of the address book information while providing an input for a user to perform a registration operation for registering the number string with the address book information,
         while the indication that the number string does not match a telephone number of at least one record of the address book information is being displayed, receive a registration operation for registering the number string with the address book information from the user via the input,
         in response to the registration operation, display a registration screen that is configured to accept new registration information from the user, and
         store an image captured by the camera portion in the memory portion by correlating the captured image with the accepted new registration information.

2. An image storing method of a communication terminal device including a display portion, a camera portion for capturing an image of a subject, a memory portion for storing address book information comprising one or more records, wherein each of the one or more records comprise a name and a telephone number, and an input portion for performing an input of a number string comprising one or more digits, the method comprising:
   once a predetermined number of digits in a number string are input, after each digit is input, determining if the number string matches a telephone number of at least one of the one or more records of the address book information;
   if it is determined that the number string matches a telephone number of at least one record, displaying the name from the at least one record; and,
   if it is determined that the number string does not match a telephone number of at least one record,
      displaying an indication that the number string does not match a telephone number of at least one record of the address book information while providing an input for a user to perform a registration operation for registering the number string with the address book information,
      while the indication that the number string does not match a telephone number of at least one record of the address book information is being displayed, receiving a registration operation for registering the number string with the address book information from the user via the input,
      in response to the registration operation, displaying a registration screen configured to accept new registration information from the user; and
      storing an image captured by the camera portion in the memory portion by correlating the captured image with the accepted new registration information.

3. The communication terminal device according to claim 1, wherein the one or more modules are further configured to, in response to a user operation, extract and display all of the one or more records which are correlated with images.

* * * * *